US010077752B1

(12) United States Patent
Lee et al.

(10) Patent No.: US 10,077,752 B1
(45) Date of Patent: Sep. 18, 2018

(54) IDLE STOP AND GO SYSTEM AND METHOD CONTROLLING THEREOF

(71) Applicants: Hyundai Motor Company, Seoul (KR); KIA Motors Corporation, Seoul (KR)

(72) Inventors: Hoon Lee, Ann Arbor, MI (US); Sejun Kim, Ann Arbor, MI (US); Kwangwoo Jeong, Ann Arbor, MI (US); Byungho Lee, Ann Arbor, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/796,294

(22) Filed: Oct. 27, 2017

(51) Int. Cl.
*F02N 11/08* (2006.01)
*F02N 11/04* (2006.01)
*B60W 30/18* (2012.01)

(52) U.S. Cl.
CPC ... *F02N 11/0829* (2013.01); *B60W 30/18127* (2013.01); *F02N 11/04* (2013.01); *F02N 11/087* (2013.01); *F02N 11/0866* (2013.01); *B60W 2510/244* (2013.01); *F02N 2011/0885* (2013.01)

(58) Field of Classification Search
CPC .. F02N 11/0829; F02N 11/0866; F02N 11/04; F02N 11/087; F02N 11/0814; F02N 11/0818; F02N 11/0825; F02N 11/0862; F02N 15/003; F02N 19/005; F02N 2011/0885; F02N 2200/021; F02N 2019/007; F02N 2019/008; B60W 30/18127; B60W 2510/244
USPC ............... 123/179.3, 179.4, 179.25, 179.28; 701/112, 113
See application file for complete search history.

(56) References Cited

U.S. PATENT DOCUMENTS

| 8,546,973 | B2 | 10/2013 | Lee |
| 9,174,525 | B2 | 11/2015 | Caron |
| 9,239,017 | B2 | 1/2016 | McDonald |

(Continued)

FOREIGN PATENT DOCUMENTS

EP    2063088 A    5/2009

OTHER PUBLICATIONS

T. Wellmann et al.; "Influence of Automatic Engine Stop/Start Systems on Vehicle NVH and Launch Performance"; SAE International J. Engines 8(4):2015, doi:10.4271/2015-01-2183; Jun. 15, 2015; pp. 1938-1946.

(Continued)

*Primary Examiner* — Hai Huynh
(74) *Attorney, Agent, or Firm* — Brinks Gilson & Lione

(57) ABSTRACT

The present disclosure provides a vehicle system including: an engine having a crankshaft to generate power; a starter motor electrically connected to a battery to start the engine; an alternator operatively connected to the crankshaft of the engine so as to generate electric power and charge the battery; a capacitor electrically connected to the alternator, the battery, and the starter motor, and enable to store the generated electric power based on a state of charge (SOC) of the battery and capacitor; and a controller to control electric connections between the alternator, the capacitor, the battery, and the starter motor. In particular, the controller determines an idle stop mode and controls a position of the crankshaft by applying a calculated electric load to the alternator such that the crankshaft position is located in a predetermined range.

19 Claims, 9 Drawing Sheets

(56) References Cited

U.S. PATENT DOCUMENTS

2016/0131100 A1    5/2016  Chen

OTHER PUBLICATIONS

M. Furushou et al.; "Stop-Start System with Compact Motor Generator and Newly Developed Direct Injection Gasoline Engine"; SAE International doi:10.4271/2012-01-0410; Apr. 16, 2012; pp. 1-7, ISSN 0148-7191.

IDLE STOP AND GO SYSTEM AND METHOD CONTROLLING THEREOF

FIELD

The present disclosure relates to a method and system for a vehicle implemented with an idle stop and go function so as to improve comfort of the vehicle and fuel efficiency of an engine.

BACKGROUND

The statements in this section merely provide background information related to the present disclosure and may not constitute prior art.

Modern vehicles have been developed to increase energy efficiency and reduce noise and vibration during driving a vehicle. As one example, a stop-and-go system is incorporated in vehicles. A typical idle stop-and-go system is a system for improving fuel efficiency by preventing unnecessary fuel consumption caused by engine idling while a vehicle is not moving.

When a vehicle stops, the idle stop-and-go system automatically stops the engine several seconds later (i.e, cutting fuel to the engine), in a called idle stop mode. Subsequently, when a driver's intention to travel the vehicle is detected, for example, when a brake pedal is released or a gear shift occurs (e.g., gear shift to a drive stage), the system automatically restarts the engine without operation of an ignition key (referred to as an idle restart mode).

However, we have discovered that during the restart of the engine, a starter motor needs to generate a greater torque to restart the engine and to provide that the speed of the engine is high enough for an ignition process to be performed successfully, thereby dropping the energy efficiency, increasing vibration of the engine and time to restart engine.

SUMMARY

The present disclosure provides a method and a system for a vehicle to control a crankshaft position to locate at a desired position, thereby deducing roughness occurring in an idle restart mode and also decreasing the amount of torque to restart an engine of the vehicle. In particular, we have discovered that when the engine stops and a piston of the engine is just located around a top-dead-center of a compression stroke, the starter motor has to drive a crankshaft of the engine to exceed the starting torque of the top-dead-center of the compression stroke. In this instance, an even greater starting torque is required to restart the engine.

In one form of the present disclosure, the vehicle system includes: an engine having a crankshaft configured to generate power; a starter motor electrically connected to a battery and configured to start the engine; an alternator operatively connected to the crankshaft of the engine and configured to generate electric power and charge the battery; a capacitor electrically connected to the alternator, the battery, and the starter motor, and configured to store the generated electric power based on a state of charge (SOC) of the battery and capacitor; and a controller configured to control electric connections between the alternator, the capacitor, the battery, and the starter motor, and to determine an idle stop mode.

In particular, in the idle stop mode, the controller is configured to control a position of the crankshaft by applying a calculated electric load to the alternator such that the crankshaft position is located in a predetermined range.

The vehicle system may further include: a first switch configured to receive a control signal from the controller and to selectively connect the alternator to the capacitor or the battery; and a second switch. The second switch is configured to receive a control signal from the controller, and to selectively connect the capacitor to the battery or the starter motor, and configured to selectively connect the battery to the starter motor.

In another form, the controller determines a brake-recuperation mode when the engine is in the idle stop mode, and the SOC of the capacitor is less than a second predetermined value, and in the brake-recuperation mode, the capacitor is electrically connected to the alternator via a regulator. The regulator is configured to gradually apply the calculated electric load to the engine via the alternator, and the calculated electric load corresponds to a brake torque reversely applied to the engine.

In still another form, the controller is configured to determine a capacitor restart mode where the engine is in an idle restart mode and the SOC of the capacitor is equal to or greater than a second predetermined value, and then the capacitor supplies electric power to the starter motor to restart the engine in the capacitor restart mode. In addition, the controller is configured to determine a battery restart mode where the engine is in the idle restart mode and the SOC of the capacitor is less than the second predetermined value, and then the battery supplies electric power to the starter motor to restart the engine in the battery restart mode.

Furthermore, the controller is configured to determine a battery charge mode where the SOC of the capacitor is equal or greater than the second predetermined value and the SOC of the batter is less than the first predetermined value, and the capacitor charges the battery in the battery charge mode.

In another form of the present disclosure, the controller is configured to determine a normal generation mode when the engine runs, and the SOC of the battery is less than the first predetermined value, and the controller connects the alternator to the battery for electrical charge in the normal generation mode.

The present disclosure provides a method of controlling a vehicle system including an engine operating an alternator selectively electrically connected to a capacitor. The method comprises: receiving, by a controller, state data of a vehicle; determining, by the controller, whether an idle stop condition is satisfied based on the received state data of the vehicle; measuring, by the controller, a state of charge of a battery and the capacitor, and comparing the measured SOC values of the battery and the capacitor with first and second predetermined values, respectively; determining, by the controller, a brake-recuperation mode when an idle stop condition is satisfied, and the measured SOC value of the capacitor is less than the second predetermined value; and calculating, by the controller in the brake-recuperation mode, an electric load corresponding to a brake torque to place a position of a crankshaft within a predetermined range, and applying, by the controller, the calculated electric load to the engine via the alternator until the position of the crankshaft is within the predetermined range.

In one form, the application of the calculated electric load is divided into first and second stages, the regulator applies major portion of the calculated electric load in the first stage so as to slow down rotation speed of the crankshaft, and later applies remaining portion of the calculated electric load in the second stage to stop the crankshaft in the predetermined range.

In another form, the controller is configured to recalculate an electric load during the application of the calculated load and apply the recalculated electric load to the engine via the alternator.

The method of the present disclosure may further includes: determining, by the controller, a battery charge mode when the measured SOC of the battery is less than the first predetermined value, and the measured SOC value of the capacitor is equal to or greater than the second predetermined value, and the capacitor charges the battery in the battery charge mode; determining, by the controller, a normal generation mode when the measured SOC of the battery is less than the first predetermined value, and the measured SOC value of the capacitor is less than the second predetermined value, and the controller connects the alternator to the battery for electric charge in the normal generation mode; determining, by the controller, a capacitor restart mode when the engine is in an idle restart mode and the SOC of the capacitor is equal to or greater than the second predetermined value, and the capacitor supplies electric power to the starter motor to restart the engine in the capacitor restart mode, and determining, by the controller, a battery restart mode when the engine is in the idle restart mode and the SOC of the capacitor is less than the second predetermined value, and the battery supplies electric power to the starter motor to restart the engine in the battery restart mode.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
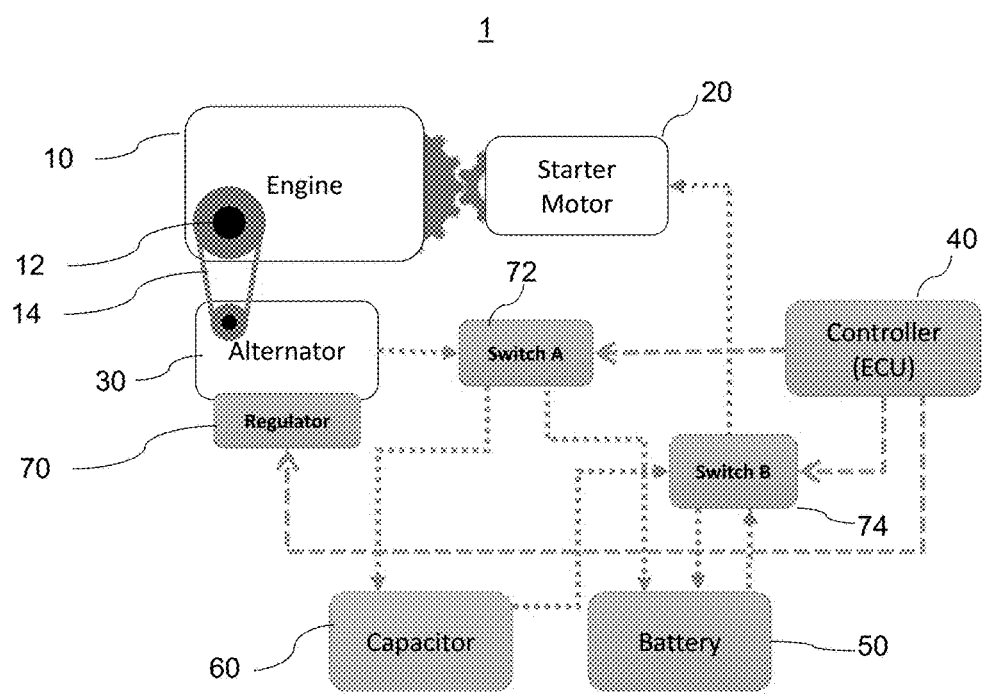
FIG. 1 is a schematic drawing of illustrating a vehicle system in general driving mode in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Here, the terms, such as 'unit' or 'module', etc., should be understood as a unit that processes at least one function or operation and that may be embodied in a hardware manner (e.g., a processor), a software manner, or a combination of the hardware manner and the software manner.

Also, throughout the present disclosure that follow, when it is described that an element is "connected" to another element, the element may be "directly or indirectly connected" to the other element or "electrically or mechanically connected" to the other element through a third element. When the element is indirectly connected to the other element, it should be understood that the element may be connected to the other element via a wireless communication network.

In general, a battery supplies electric power to a starter motor to start an engine when a drive turns on an ignition switch, and the engine keeps running even when the vehicle is stopped. This idling status negatively impacts on the fuel efficiency.

In order to enhance the fuel efficiency of a vehicle, an idle stop-and-go system have been developed. The idle stop-and-go system automatically cuts fuel supply to the engine during the idling status by detecting the vehicle speed, and operation of a brake etc., and resumes to supply fuel without operation of the ignition key when the driver's intention to travel the vehicle is detected, for example, when a brake pedal is released or a gear is shifted to a drive state. However, we have discovered that the disclosed systems have shortcomings that, during the idle restart of the engine, undesired vibration occurs, and a relatively large sized starter motor is used to generate torque enough to promptly start the engine. In particular, the speed of the engine from a rest state (e.g., idle-stop state) to an ignition state (e.g., restart state) cannot be accomplished unless a torque to restart the engine is great enough for the restart.

For example, when the engine stops and a piston of the engine is located around a top-dead-center of a compression stroke, a greater starting torque is required to restart the engine. This means that the starter motor consumes more electric power to generate the desired torque. We have discovered that precisely controlling the position of the piston (i.e., the position of the crankshaft such as its rotation angle) may reduce the restart torque and electric power desired for the restart.

In addition, positioning a crankshaft of an engine at a desired location reduces time and energy to restart the engine and also decreases roughness occurring during the engine idle restart. The present disclosure provides a method and a system to reduce energy consumption and robustness of the idle restart while performing various modes for engine operation.

The present disclosure utilizes an alternator to control the position of a crankshaft of an engine and improves energy efficiency by storing generated electric power to a capacitor based on measured SOC of the battery and capacitor.

FIG. 1 is a schematic block diagram to illustrate a vehicle system to control a position of a crankshaft in one form of the present disclosure. Referring to FIG. 1, the vehicle system 1 includes: an engine 10 to generate power for a vehicle; a starter motor 20 to start the engine 10; an alternator 30 operatively connected to a crankshaft 12 of the engine and generate electric power; a capacitor 60 selectively connected to the alternator 30, a battery 50, and the starter motor 20; and a controller 40 controlling the electric connections between the capacitor, alternator, battery, and starter motor.

In particular, the controller may determine various modes of the vehicle based on state data of the vehicle. The controller 40 may be a microprocessor including a CPU, a ROM to store a processing program, a RAM to temporarily store data, and input and output ports. The controller 40 may receive: an ignition signal from a ignition switch, a shift position from a shift position sensor, an acceleration signal corresponding to a depression of an accelerator pedal detected by an accelerator pedal position sensor, a brake signal corresponding to a depression of a brake pedal detected by a brake pedal position sensor, a vehicle speed from a vehicle speed sensor, and signals from various sensors that detect an operation state of the engine 10 such as a crank angle (CA) from a crank position sensor that detects a rotational position of the crankshaft 12, as well as a state of charge (SOC) of the capacitor 60, battery 50. In one form, the SOC of the battery can be estimated by an engine control unit (ECU), and the SOC of the capacitor 60 can be measured by measuring the voltage of the capacitor by a voltage sensor. In another form, the ECU and controller 40 may be integrated in a single unit.

The vehicle system 1 of the present disclosure may include: a first switch 72 to receive a control signal from the controller 40 and to selectively connect the alternator 30 to the capacitor 60 or the battery 50; and a second switch 74 to receive a control signal from the controller, selectively connect the capacitor to the battery or the starter motor, and to selectively connect the battery to the starter motor; and a regulator 70 to selectively apply electric load to the alternator 30 under the control of the controller 40. In one form, the regulator 70 has the function of a pulse width modulation (PWM).

Based on the SOC of the capacitor and battery, the controller 40 controls the electric connections between the alternator 30, the capacitor 60, and the battery 50. For example, when the engine 10 runs, and the controller 40 compares the SOC of the battery with a first predetermined value to determine whether the SOC of the battery is less than the first predetermined value. If the SOC of the battery is less than the first predetermined value, the controller 40 retrieves the SOC of the capacitor 60 to compare with a second predetermined value. When the SOC of the capacitor 60 is determined as being lower than the second predetermined value, the controller 40 connects the alternator to the battery for electrical charge (referred to as a normal generation mode).

Figure 2A:
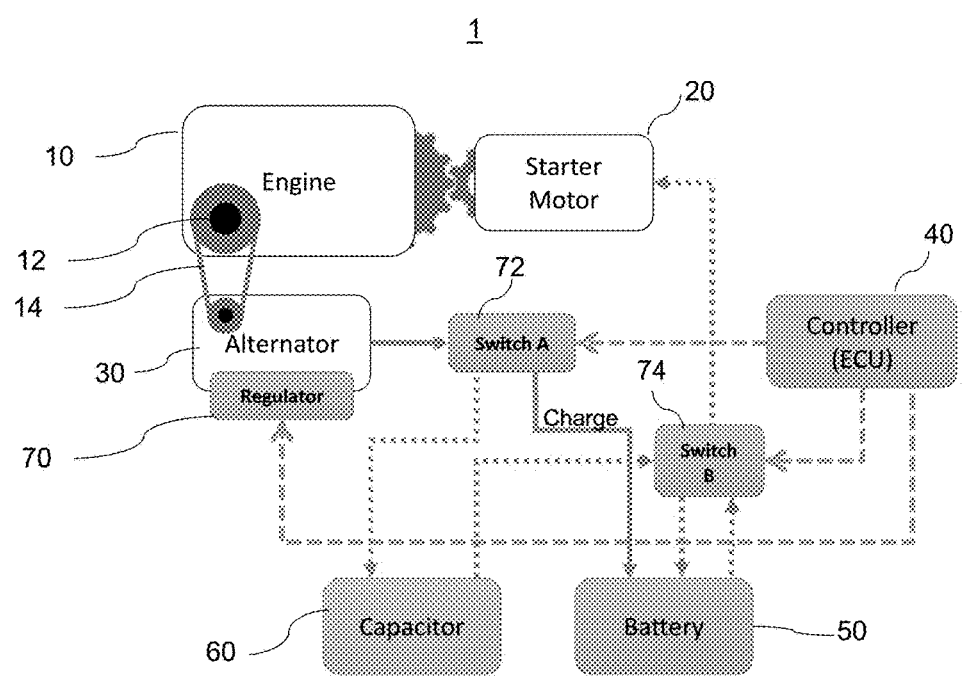
FIGS. 2A-2E are schematic drawings in various modes in one form of the present disclosure.

FIG. 2A illustrates a schematic diagram of the normal generation mode, in which the controller 40 sends a control signal to the first switch 72 to connect the alternator and the battery so that the electric power generated by the alternator 30 is stored in the battery until the SOC of the battery is equal to or greater than the first predetermined value. If the SOC of the battery 50 is equal to or greater than the first predetermined value, the alternator 30 is connected to none of the capacitor and battery.

Figure 2B:
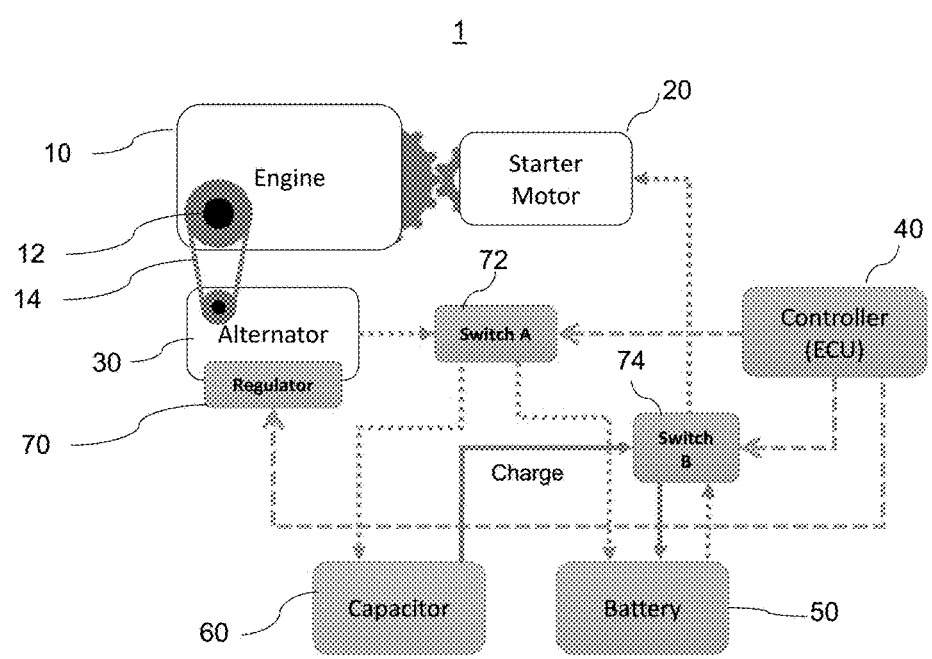

FIG. 2B illustrates the battery charge mode in which the SOC of the battery is less that the first predetermined value and the SOC of the capacitor is equal to or greater than the second predetermined value. In this mode, the capacitor is connected to the battery to charge it. More specifically, the controller 40 sends a signal to the second switch 74 to have the capacitor 60 to charge the battery 50 until the SOC of the capacitor is below the second predetermined value so as to secure the capacity to store electricity generated in the following brake-recuperation mode. In one form, the controller may control a switch C integrated in the alternator or the regulator 70 to be turned off not to generate electricity. This mode is referred to as a battery charge mode, namely, battery charge by the capacitor.

That is, the controller determine the battery charge mode when the SOC of the batter is less than the first predetermined value, and the SOC of the capacitor is equal or greater than the second predetermined value. In the battery charge mode, the capacitor charges the battery. Because any electric load is not applied to the alternator mechanically coupled to the engine 10, a load applied to the engine is reduced and thus fuel efficiency is improved. This feature is described below in detail.

As shown in FIG. 1, the vehicle system 1 is configured with the alternator 30 that is mechanically coupled to the engine 10 via a belt 14. In this configuration, a current and/or voltage may be applied to a field coil of the alternator 30 to generate an alternator output current to power various electrical loads (e.g., ancillary electrical devices) and to charge the battery and/or the capacitor. Since the alternator is mechanically coupled to the engine, the current applied to the field coil of the alternator may be configured to adjust a load applied to the engine. In other words, the increase of voltage and/or current to the field coil may cause increase of an additional load and braking force to the engine. This feature will be applied to control the position of the crankshaft 12 as follows.

Figure 2C:
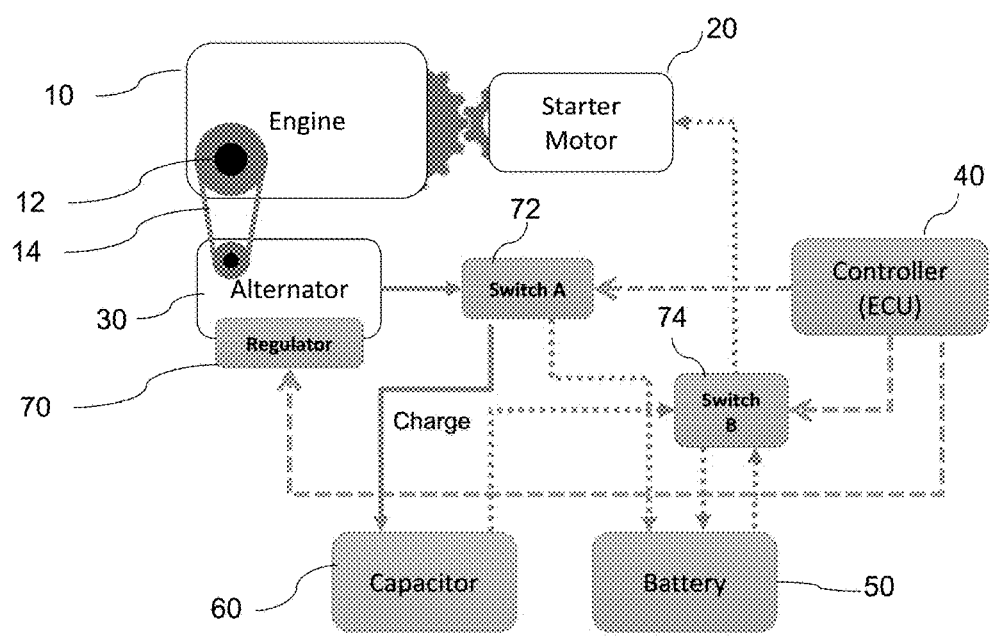

Referring to FIG. 2C, the controller 40 determines a brake-recuperation mode when the engine is in an idle stop mode, and the SOC of the capacitor is less than the second predetermined value. In the brake-recuperation mode, the capacitor 60 is electrically connected to the alternator 30 via the switch 72 which is controlled by the controller 40. In particular, in the brake-recuperation mode, the controller may control a position of the crankshaft 12 by applying a calculated electric load to the alternator 30 via a regulator 70 such that the crankshaft position is located in a predetermined range. The generated electricity by applying the electric load is used to charge the capacitor. Here, the term "required electric load" or "calculated electric load" means the amount of load to produce negative torque to be applied to an engine via an alternator.

In one form, the regulator 70 may gradually apply the calculated electric load to the engine 10 via the alternator 30, and the calculated electric load corresponds to a brake torque (e.g., negative torque) reversely applied to the engine. For example, the controller may send control signals to the regulator 70 to perform first and second control phases. For the first control phase, the controller 40 calculates an initial electric load corresponding to an initial brake torque based on an engine speed at the time at which the engine stop is requested, and engine inertia.

The engine crankshaft dynamics can be simplified as the following equation:

$$I_{eng}\ddot{\theta}=T_{total},T_{total}=T_{combustion}-T_{friction}(\dot{\theta})-T_{parasitic}(\dot{\theta})-T_{generative},$$

where $I_{eng}$ is total engine crankshaft inertia; $\dot{\theta}$ is crankshaft angular velocity; $T_{combustion}$ is the propulsion torque generated by combustion process; $T_{friction}$ is engine friction torque; $T_{parasitic}$ is the torque applied to engine by parasitic components except alternator such as coolant pump and oil pump; and, $T_{generative}$ is the torque applied by alternator for generating electricity. Then $T_{combustion}$ becomes zero during engine stop process. Since the friction and the parasitic torque are system characteristics, the crankshaft angle can be controlled by manipulating the alternator load.

The amount of the initial electric load is to slow down the crankshaft rotation quickly but not to stop the motion completely. Depending on the size of the alternator in the vehicle, maximum electric load may apply for a short period of time until the engine speed drops below a certain threshold [added by HL]]. In other form, the amount of the initial electric load (i.e., initial brake torque) can be determined by engine tests and stored in a memory to be retrieved by the controller 40 on demand.

After the first phase, the regulator 70 performs the second control phase in which partial load is applied to the engine via the alternator 30 in order to make the crankshaft 12 to stop at a desired position. The desired position may vary depending on the engine type, but it is determined by considering the crank angle where the first firing cylinder at the event of re-start initiates combustion by traveling minimum amount of angle.

In one for, the brake torque load (i.e., electric load) in this second phase can be controlled by a closed-loop control algorithm. For example, the controller 40 receives inputs such as a current crankshaft position θ, a current crankshaft speed Δt (e.g., the time duration between the two consecutive teeth that pass by crankshaft position hall sensor or two consecutive peaks from magnetic sensor), and a desired crankshaft position $\theta_d$. The controller 40 processes the received inputs to output % duty of pulse width modulation (PWM) for the regulator 70 which is preferably a PWM module. The closed loop control algorithm changes the pulse width between 0% and 100% until the current crankshaft position θ becomes equal to or very close to the desired crankshaft position (i.e., $\theta \cong \theta_d$).

Figure 4:
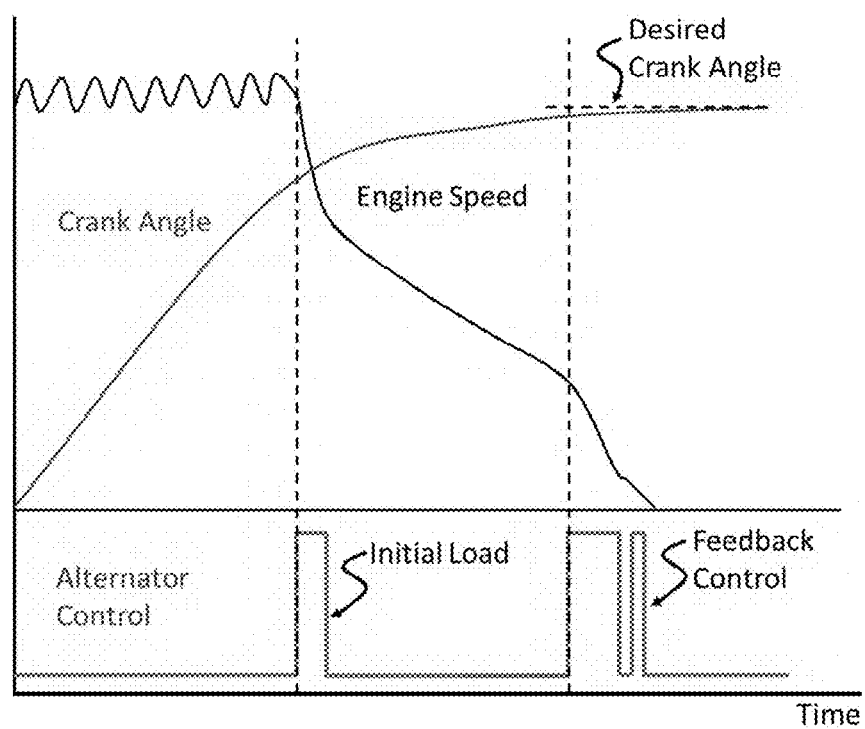
FIG. 4 are graphs illustrating phases of a crank angle and engine speed when a closed-loop control algorithm applies.

As briefly illustrated with the below equation and graph in FIG. 4, the closed loop control algorithm outputs the desired position base on inputs. In particular, when engine speed falls below a certain level, the percent duty becomes $$\% \text{ Duty} = 100 - k \cdot \theta_{error}$$

where $\theta_{error} = \theta_d - \theta$, and k is a controller parameter.

The control algorithm is terminated when the crankshaft stops at the desired position.

Figure 2D:
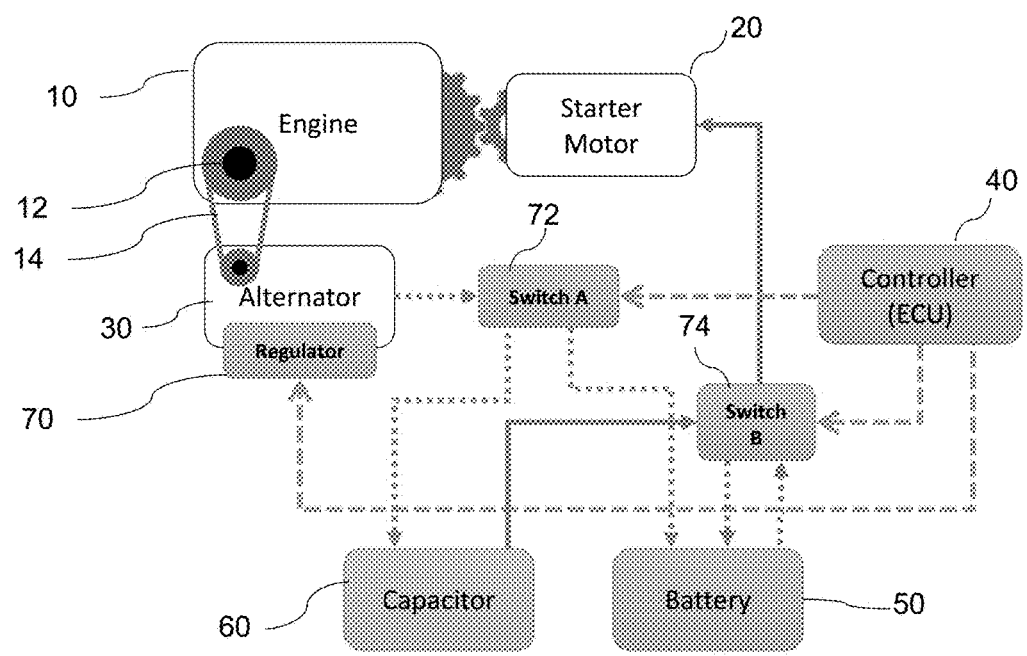
Figure 2E:
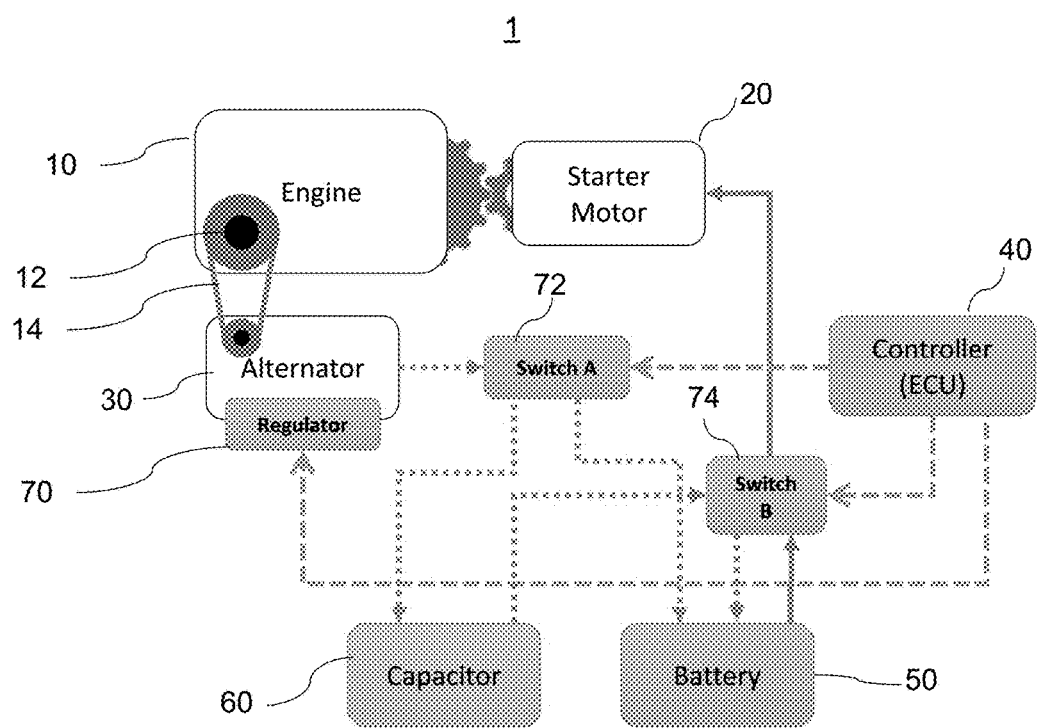

FIGS. 2D and 2E illustrate restart modes when the controller 40 determines to restart the engine 10 upon received state data of the vehicle (e.g., an acceleration signal, a brake signal, a shift position signal etc.). For example, when a driver releases a brake pedal and depresses an accelerator pedal to go forward, the controller 40 restarts the engine 10 by operating the starter motor 20. To restart the engine 10, the controller 40 first determines if the capacitor 60 is charged enough to restart the engine based on the measured SOC of the capacitor. If the SOC of the capacitor is greater than a predetermined value, the controller connects the capacitor 60 to the starter motor 20 via a second switch 74 (referred to as a capacitor restart mode).

FIG. 2D illustrates electric connections between the capacitor 60 and the starter motor 20 in the capacitor restart mode where the engine 10 is in an idle restart mode and the SOC of the capacitor is equal to or greater than the second predetermined value. In the capacitor restart mode, the controller 40 controls the first switch 72 and the regulator 70 to be OFF, and the second switch 74 to be ON to form the electrical path between the capacitor 60 and the starter motor 20 such that the capacitor 60 directly supplies electric power to the starter motor 20 to restart the engine 10.

However, as illustrated in FIG. 2E, when the controller 40 determines that the SOC of the capacitor is less than the predetermined value (i.e., second predetermined value) in the idle restart mode, the controller connects the battery 50 to the starter motor (referred to as a battery restart mode). In the battery restart mode, the controller 40 controls the first switch 72 to be OFF and the second switch 74 to be ON to form the electrical path between the battery 50 and the starter motor 20 such that the battery 50 directly supplies electric power to the starter motor 20 to restart the engine 10.

As discussed above, the vehicle system of the present disclosure determines whether the vehicle is in the idle stop mode, the idle restart mode, the brake-recuperation mode, the capacitor restart mode, the battery charge mode, the battery restart mode, and the normal generation mode, based on the state data of the vehicle, including the SOC of the capacitor and the battery. By controlling electric connections between the alternator, capacitor, battery, and starter motor based on the determined mode, the vehicle system improves the fuel efficiency.

In particular, in the brake-recuperation mode, the controller may control a position of the crankshaft 12 by applying a calculated electric load to the alternator 30 such that the crankshaft position is located in a predetermined range in which a restart torque for the engine is less than in other range. In addition, the generated electricity by applying the electric load is used to charge the capacitor. Accordingly, fuel efficiency is improved, and the restart process of the engine is smooth and roughness occurring in the engine idle stop and restart is significantly reduced.

Figure 3A:
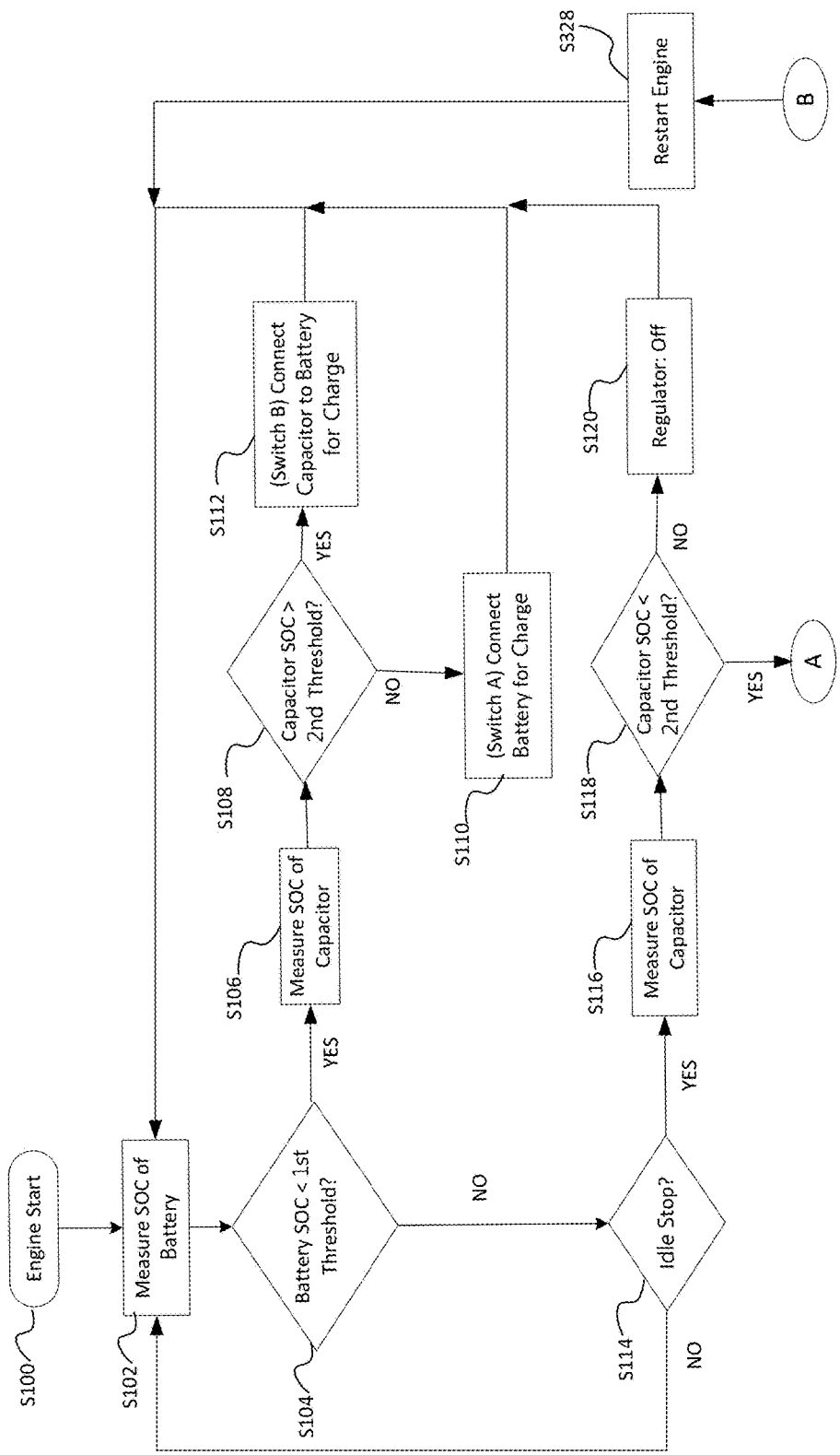
FIGS. 3A-3B are flow charts illustrating a method of controlling a vehicle system as one exemplary form of the present disclosure.
Figure 3B:
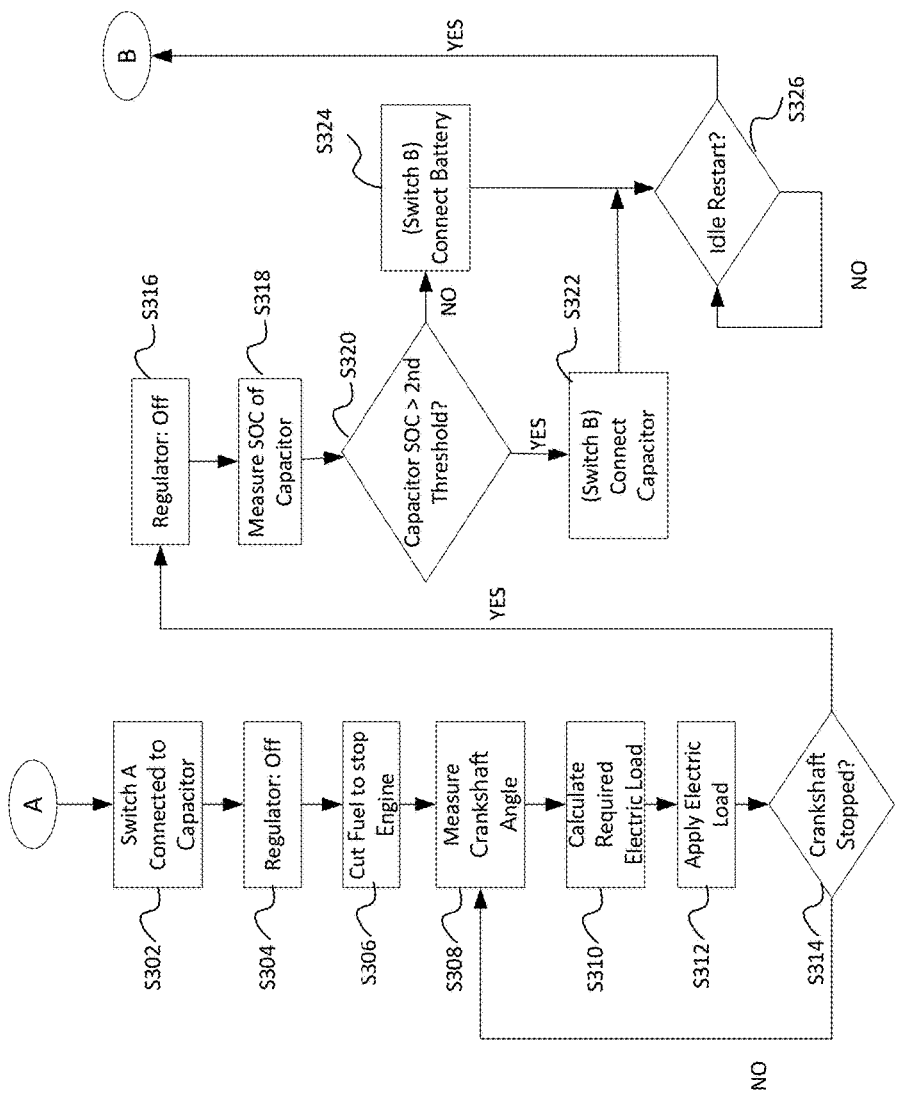

In another form of the present disclosure, a control method is provided to control a vehicle system including an engine operating an alternator that is selectively electrically connected to a capacitor. FIGS. 3A-3B describe in detail how the controller 40 determines an operation mode of the vehicle system based on received state data of a vehicle to control the vehicle system and how to control a position of a crankshaft of an engine. The controller 40 of the vehicle system may be implemented as one or more microprocessors operated by a predetermined program. When a driver turns on an ignition switch of the vehicle, the battery 50 supplies electric power to the starter motor 20 to start the engine 10 (referred to as a battery start mode) in S100.

Once the engine is started in S100, the engine 10 runs the alternator 30, which is mechanically coupled to the engine, so that the alternator may generate electric energy. The controller 40 measures the SOC of the battery 50 in S102 and determines whether the SOC of the battery is greater than a first predetermined value in S104. When the SOC of the battery 50 is greater than the first predetermined value (i.e., high SOC state) in S104, a field current is not supplied to the alternator 30 so that the alternator does not generate the electric power (referred to as a normal driving mode). In this state, as described in FIG. 1, the regulator 70 and first and second switches 72, 74 are all turned off.

In S104, if the SOC of the battery is below the first predetermined value, the controller 40 proceeds to measure the SOC of the capacitor 60 in S106. The measured SOC of the capacitor is compared with a second predetermined value in S108 in order to decide which energy source (i.e., the capacitor, the alternator) will be used to charge the battery. That is, if the controller 40 determines that the capacitor is in the high SOC state enough to charge the battery in S108, the controller electrically connects the capacitor 60 to the battery 50 to charge the battery in S112, called as the battery charge mode. If the SOC of the capacitor 60 is less than the second predetermined value, the controller 40 connects the alternator 70 to the battery 50 to charge the battery in S110, namely, the normal generation mode.

In S114, the controller determines whether an idle stop condition is satisfied based on received data of the vehicle such as a vehicle speed, engine idling state, operation of the brake, etc. When the idle stop condition of the idle stop-and-go system is satisfied, the controller measures the SOC of the capacitor 60 in S116 to proceed to a comparing step S118. In the comparing step S118, the SOC of the capacitor is compared with the second predetermined value. When the SOC of the capacitor 60 is less than the second predetermined value, the controller performs the brake-recuperation mode. In another form, the controller 40 may monitor the SOC of the capacitor to maintain the SOC at an appropriate level (e.g., below the second predetermined value) via discharge (e.g., charging the battery by the capacitor).

Steps from S302 to S314 show each process of the brake-recuperation mode. More specifically, in S302, the alternator 30 is connected to the first switch 72 by the controller 40 to be ready to charge the capacitor. In S304, the regulator 70 is set to a OFF state (i.e., zero load state) for the first time until the controller 40 calculates the required electric load in 310. While the regulator 70 is in the OFF state, the controller 40 controls the engine to cut the fuel to stop the engine in S306, and measures a crank angle (i.e., a position of the crankshaft 12) in S308. In S310, the controller calculates a required electric load to place the position of the crankshaft 12 in the desired position in S310.

As discussed above in conjunction with FIG. 2C, in the brake-recuperation mode, the controller 40 may control a position of the crankshaft 12 by applying the calculated electric load to the alternator 30 such that the crankshaft position is located in a predetermined range. In S312, the regulator 70 may gradually apply the calculated electric load (i.e., the required electric load) to the engine 10 via the alternator 30, and the calculated electric load corresponds to a brake torque reversely applied to the engine. The initial electric load of the calculated electric load is proportional to the amount of the angular displacement for the crankshaft 12 to rotate from the current position to the desired position.

In one form, the application of the calculated electric load is divided into first and second stages, and the regulator 70 applies major portion of the calculated electric load in the first stage so as to slow down rotation speed of the crankshaft 12. After that, the regulator applies remaining portion of the calculated electric load in the second stage to stop the crankshaft in the predetermined range.

In particular, once the amount of the required electric load is known, the regulator 70 acts as a PWM-type module (switching between on and off at the given frequency) to control the amount of load to be applied to the engine 10 through the alternator 30. In order to precisely control the position of the crankshaft 12, in one form of the present disclosure, the amount of electric load may be re-estimated by the controller at the every time step of controller 40, based on the remaining angle to travel. The re-estimated electric load is applied to the engine via the alternator. This control effort lasts until the controller determines that the crankshaft 12 eventually stops at the vicinity of the desired position in S314.

Once the crankshaft is stopped, the controller 40 turns off the regulator 70 in S316 and proceeds to step S318 in which the controller measures the SOC of the capacitor 60 to determine a proper restart mode among the battery restart and capacitor restart modes in S320. When the SOC of the capacitor is equal to or greater than the second predetermined value in S320, the controller 40 connects the capacitor 60 to the starter motor 20 in S322, whereas the battery 50 is connected to the starter motor 20 in S324 when the SOC of the capacitor is less than the second predetermined value in S324. Once an idle restart mode of the idle stop-and-go system is determined by the controller in S326 based on inputs from various sensor (e.g., a shift position sensor, an accelerator pedal sensor, a speed sensor etc.), the engine 10 is restarted by the starter motor 20 in S328. To restart the engine 10, the starter motor 20 is supplied with electric power from the capacitor in the capacitor restart mode or from the battery in the battery restart mode.

As described above, the controller determines the capacitor restart mode when the engine is in the idle restart mode and the SOC of the capacitor is equal to or greater than the second predetermined value, and then the capacitor directly supplies electric power to the starter motor to restart the engine in the capacitor restart mode. In the battery restart mode where the engine 10 is in the idle restart mode and the SOC of the capacitor is less than the second predetermined value, the battery supplies electric power to the starter motor to restart the engine.

As illustrated above, the present disclosure improves driving comfort by reducing shocks and roughness occurring in the engine idle restart through precise control of the position of the crankshaft to be at a desired location. In addition, positioning the crankshaft of the engine at the desired location reduces time and energy to restart the engine.

In addition, the present disclosure improves energy efficiency by storing generated electric power to a capacitor while positioning the crankshaft at the desired position by applying electric load.

Although the present disclosure has been shown and described with respect to specific exemplary forms, it will be obvious to those skilled in the art that the present disclosure may be variously modified and altered without departing from the spirit and scope of the present disclosure.

What is claimed is:

1. A vehicle system comprising:
   an engine having a crankshaft configured to generate power;
   a starter motor electrically connected to a battery and configured to start the engine;
   an alternator operatively connected to the crankshaft of the engine and configured to generate electric power and charge the battery;
   a capacitor electrically connected to the alternator, the battery, and the starter motor, and configured to store the generated electric power based on a state of charge (SOC) of the battery and capacitor; and
   a controller configured to control electric connections between the alternator, the capacitor, the battery, and the starter motor, and to determine an idle stop mode,
   wherein in the idle stop mode, the controller is configured to control a position of the crankshaft by applying a calculated electric load to the alternator such that the crankshaft position is located in a predetermined range.

2. The vehicle system of claim 1, further comprising:
   a first switch configured to receive a control signal from the controller and to selectively connect the alternator to the capacitor or the battery; and
   a second switch configured to:
     receive a control signal from the controller,
     selectively connect the capacitor to the battery or the starter motor, and
     selectively connect the battery to the starter motor.

3. The vehicle system of claim 1, wherein the controller determines a brake-recuperation mode when the engine is in the idle stop mode, and the SOC of the capacitor is less than a second predetermined value, and in the brake-recuperation mode, the capacitor is electrically connected to the alternator via a regulator, and
   wherein the regulator is configured to gradually apply the calculated electric load to the engine via the alternator, and the calculated electric load corresponds to a brake torque reversely applied to the engine.

4. The vehicle system of claim 1, wherein the controller is configured to determine a capacitor restart mode where the engine is in an idle restart mode and the SOC of the capacitor is equal to or greater than a second predetermined value, and the capacitor supplies electric power to the starter motor to restart the engine in the capacitor restart mode, and wherein the controller is configured to determine a battery restart mode where the engine is in the idle restart mode and the SOC of the capacitor is less than the second predetermined value, and the battery supplies electric power to the starter motor to restart the engine in the battery restart mode.

5. The vehicle system of claim 4, wherein the controller is configured to determine a battery charge mode where the SOC of the capacitor is equal or greater than the second predetermined value and the SOC of the batter is less than the first predetermined value, and the capacitor charges the battery in the battery charge mode.

6. The vehicle system of claim 5, wherein the controller is configured to determine a normal generation mode when the engine runs, and the SOC of the battery is less than the first predetermined value, and the controller connects the alternator to the battery for electrical charge in the normal generation mode.

7. The vehicle system of claim 1, wherein the controller determines the predetermined range based on a crank angle relative to a first firing cylinder in the engine.

8. A method of controlling a vehicle system including an engine operating an alternator, the alternator selectively electrically connected to a capacitor, the method comprising:
receiving, by a controller, state data of a vehicle;
determining, by the controller, whether an idle stop condition is satisfied based on the received state data of the vehicle;
measuring, by the controller, a state of charge of a battery and the capacitor, and comparing the measured SOC values of the battery and the capacitor with first and second predetermined values, respectively;
determining, by the controller, a brake-recuperation mode when an idle stop condition is satisfied, and the measured SOC value of the capacitor is less than the second predetermined value; and
calculating, by the controller in the brake-recuperation mode, an electric load corresponding to a brake torque to place a position of a crankshaft within a predetermined range, and
applying, by the controller, the calculated electric load to the engine via the alternator until the position of the crankshaft is within the predetermined range.

9. The method of claim 8, wherein the application of the calculated electric load is divided into first and second stages, the regulator applies major portion of the calculated electric load in the first stage so as to slow down rotation speed of the crankshaft, and later applies remaining portion of the calculated electric load in the second stage to stop the crankshaft in the predetermined range.

10. The method of claim 8, wherein the controller is configured to recalculate an electric load during the application of the calculated load and apply the recalculated electric load to the engine via the alternator.

11. The method of claim 8, further comprising:
determining, by the controller, a battery charge mode when the measured SOC of the battery is less than the first predetermined value, and the measured SOC value of the capacitor is equal to or greater than the second predetermined value, and the capacitor charges the battery in the battery charge mode;
determining, by the controller, a normal generation mode when the measured SOC of the battery is less than the first predetermined value, and the measured SOC value of the capacitor is less than the second predetermined value, and the controller connects the alternator to the battery for electric charge in the normal generation mode;
determining, by the controller, a capacitor restart mode when the engine is in an idle restart mode and the SOC of the capacitor is equal to or greater than the second predetermined value, and the capacitor supplies electric power to the starter motor to restart the engine in the capacitor restart mode, and
determining, by the controller, a battery restart mode when the engine is in the idle restart mode and the SOC of the capacitor is less than the second predetermined value, and the battery supplies electric power to the starter motor to restart the engine in the battery restart mode.

12. The method of claim 8, wherein the controller determines the predetermined range based on a crank angle relative to a first firing cylinder in the engine.

13. A vehicle system for a vehicle having an engine, a starter motor and a battery, the engine having a crankshaft configured to generate power, and the starter motor electrically connected to the battery and configured to start the engine, the vehicle system comprising:
an alternator operatively connected to the crankshaft of the engine and configured to generate electric power and charge the battery;
a capacitor electrically connected to the alternator, the battery, and the starter motor, the capacitor configured to store the generated electric power based on a state of charge (SOC) of the battery and capacitor; and
a controller configured to control electric connections between the alternator, the capacitor, the battery, and the starter motor, and to determine an idle stop mode,
wherein in the idle stop mode, the controller is configured to control a position of the crankshaft by applying a calculated electric load to the alternator such that the crankshaft position is located in a predetermined range.

14. The vehicle system of claim 13, wherein the controller determines the predetermined range based on a crank angle relative to a first firing cylinder in the engine.

15. The vehicle system of claim 13, further comprising:
a first switch configured to receive a control signal from the controller and to selectively connect the alternator to the capacitor or the battery; and
a second switch configured to:
receive a control signal from the controller,
selectively connect the capacitor to the battery or the starter motor, and
selectively connect the battery to the starter motor.

16. The vehicle system of claim 13, wherein the controller determines a brake-recuperation mode when the engine is in the idle stop mode, and the SOC of the capacitor is less than a second predetermined value, and in the brake-recuperation mode, the capacitor is electrically connected to the alternator via a regulator, and
wherein the regulator is configured to gradually apply the calculated electric load to the engine via the alternator, and the calculated electric load corresponds to a brake torque reversely applied to the engine.

17. The vehicle system of claim 13, wherein the controller is configured to determine a capacitor restart mode where the engine is in an idle restart mode and the SOC of the capacitor is equal to or greater than a second predetermined value, and the capacitor supplies electric power to the starter motor to restart the engine in the capacitor restart mode, and wherein the controller is configured to determine a battery restart mode where the engine is in the idle restart mode and the SOC of the capacitor is less than the second predetermined value, and the battery supplies electric power to the starter motor to restart the engine in the battery restart mode.

18. The vehicle system of claim 17, wherein the controller is configured to determine a battery charge mode where the SOC of the capacitor is equal or greater than the second predetermined value and the SOC of the batter is less than the first predetermined value, and the capacitor charges the battery in the battery charge mode.

19. The vehicle system of claim 18, wherein the controller is configured to determine a normal generation mode when the engine runs, and the SOC of the battery is less than the first predetermined value, and the controller connects the alternator to the battery for electrical charge in the normal generation mode.

* * * * *